July 21, 1959
G. LUGLI
2,895,525
PNEUMATIC TIRE
Filed Dec. 26, 1956
5 Sheets-Sheet 1
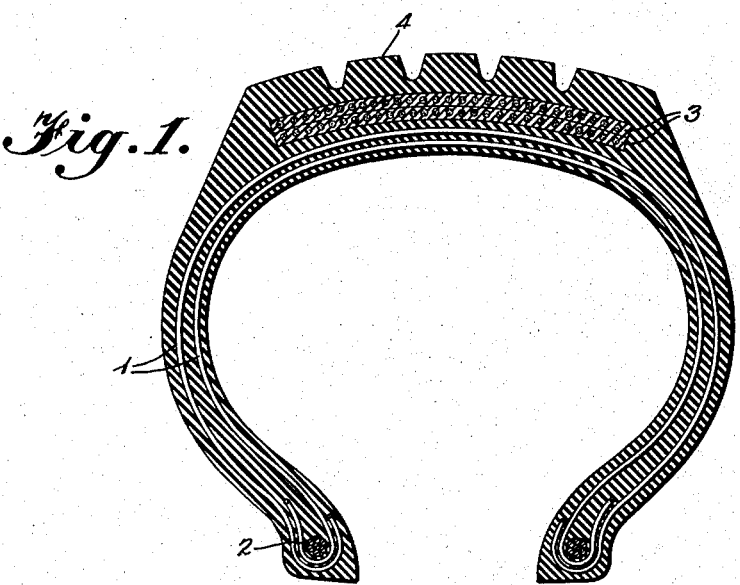
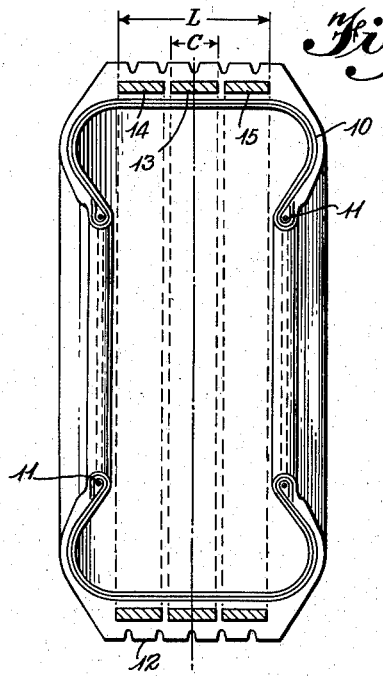
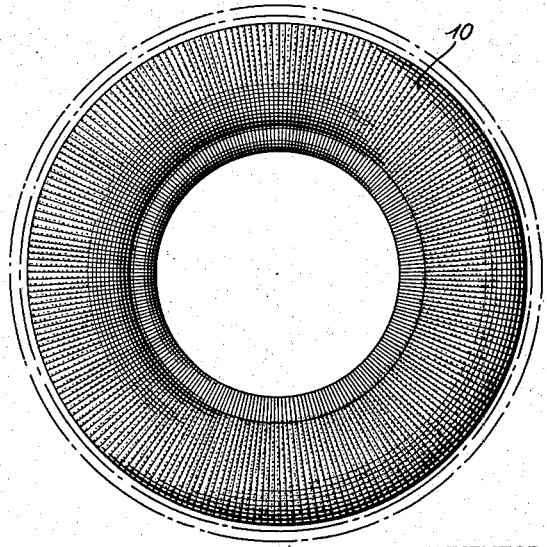
INVENTOR
*Giuseppe Lugli*
BY *Stevens, Davis, Miller & Mosher*
ATTORNEYS

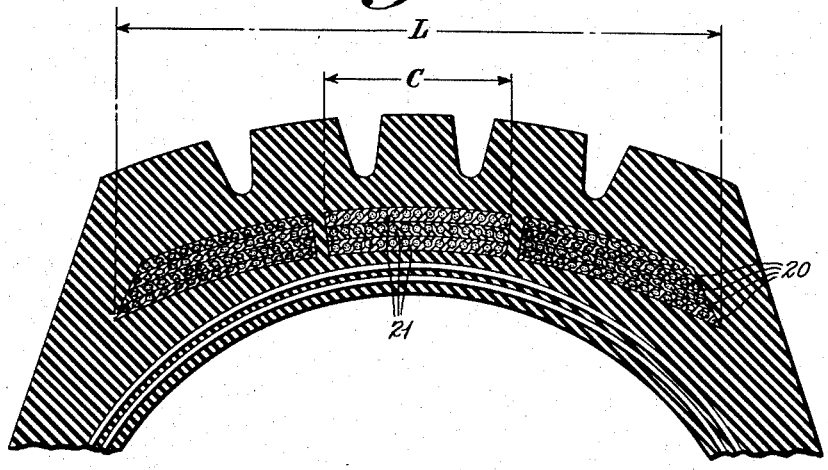
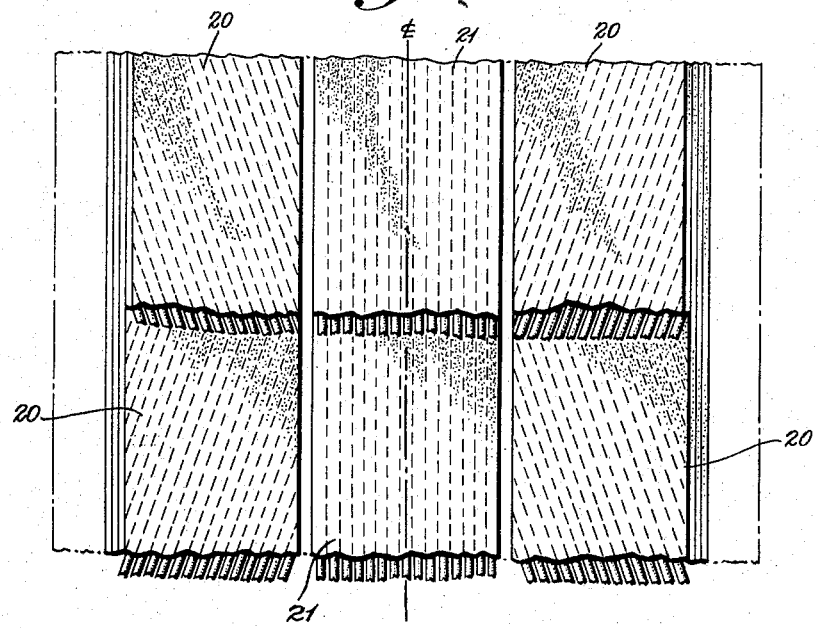

INVENTOR
Giuseppe Lugli
BY Stevens, Davis, Miller & Mosher
ATTORNEYS

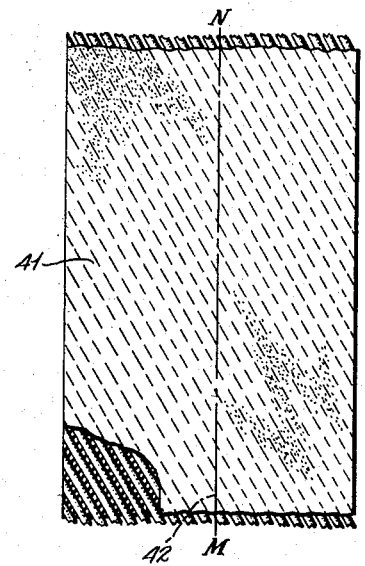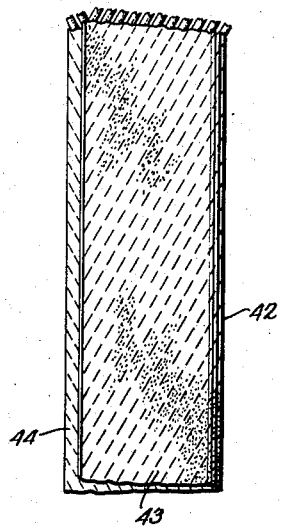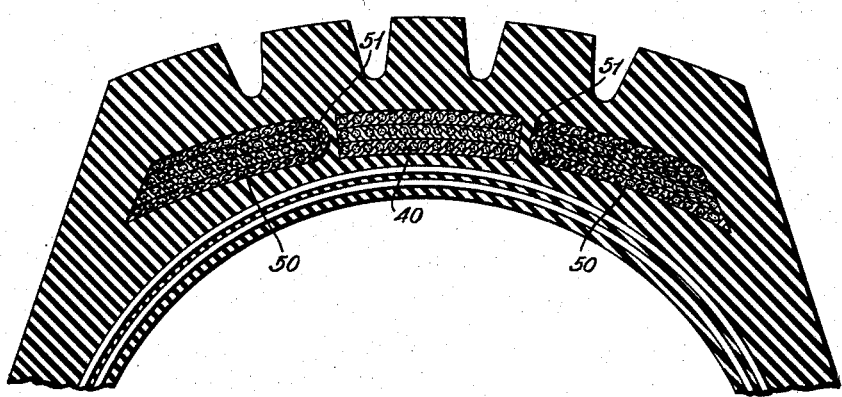

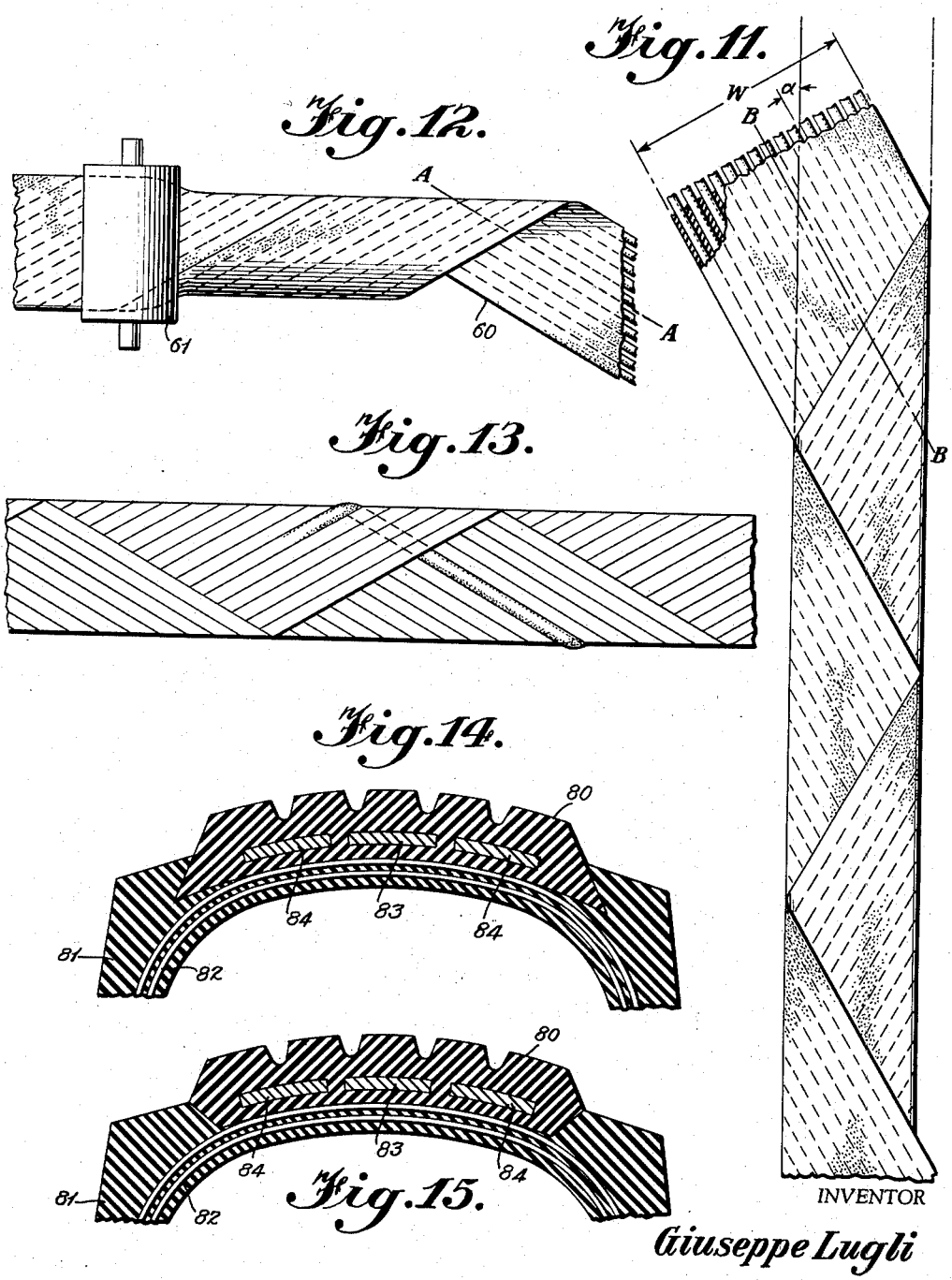

United States Patent Office 2,895,525
Patented July 21, 1959

2,895,525

PNEUMATIC TIRE

Giuseppe Lugli, Milan, Italy, assignor to Pirelli S.p.A., Milan, Italy

Application December 26, 1956, Serial No. 630,547

Claims priority, application Italy March 21, 1951

29 Claims. (Cl. 152—354)

The present invention relates to an improved structure for pneumatic tires for use on vehicle wheels of all types, and in particular to an improved cincture belt arrangement for incorporation into pneumatic tires and to the improved pneumatic tires resulting therefrom. This application is a continuation-in-part of a co-pending application for Pneumatic Tire bearing Serial No. 627,468 and a filing date of December 10, 1956. Said co-pending application was filed jointly in the names of Giuseppe Lugli, Luigi Emanueli, and Carlo Mazza, and itself is a continuation-in-part of the following co-pending applications:

Serial No. 274,085, filed February 29, 1952 (Luigi Emanueli),
Serial No. 316,356, filed October 22, 1952 (Giuseppe Lugli and Carlo Mazza),
Serial No. 439,791, filed June 8, 1954 (Luigi Emanueli),
Serial No. 555,713, filed December 22, 1955 (Giuseppe Lugli),
Serial No. 568,665, filed February 2, 1956 (Giuseppe Lugli).

Applications Serial No. 274,085; 316,356; and 439,791 are now abandoned.

It is a principal object of the invention contained in said co-pending application to provide a novel structure for a pneumatic tire that harmonizes the various aims or goals sought after in a pneumatic tire. Thus, a unique and ingeniously conceived structure is presented which is characterized by a longer tread life, softer riding qualities, a lowered power loss, greater dirigibility, lower heat generation, as well as others. Prior to the advent of the invention embodied in the aforesaid application, the improvement of one of these correlative qualities had always adversely affected one or more other qualities and resulted in a diminishing of the affected qualities.

The highly advantageous achievement presented in said co-pending application was derived by obtaining the fullest measure from each contributing component of the structure rather than sacrificing quality in one component to obtain a greater function of another as has been dictated by the technological conclusions heretofore reached.

For instance, the preparation of a tire carcass has always been thought of in terms of plural plies each composed of radial cords, i.e., cords which lay in radial planes with respect to the center axis of the carcass. Although this has always represented an ideal condition, nevertheless, it has never been realized from a practical standpoint because of the attendant disadvantage of almost complete loss of dirigibility resulting in high unstability during running. Ancillary manifestations of tires made in this fashion were increased tread wear and substantially higher power loss. Accordingly, the art has forsaken the ideal and has taken the tack, that a good tire requires less than the ideal for the carcass. The expedients adopted are varied but mostly take the form of arranging the cords at a bias, as distinguished from in a radial plane, so that the cords lay at an acute angle to the mid-circumferential plane of the tire generally within the range of from 30° to 60°. By crossing the cords in alternate plies of the casings, at such angles so that the cords in successive plies are symmetrically disposed with respect to the mid-circumferential plane, the casings were stabilized and the necessary dirigibility resulted. Since, however, the cords no longer lay in radial planes (normal to the mid-circumferential plane) there quite naturally resulted a loss in utilization of the tensile strength of the cords. This sacrifice has been felt worthwhile.

Another plaguing facet of the technological problem of designing and building a remarkably improved tire is the matter of tread wear. Although some success has been experienced by improving the compounding of the tread stock, these efforts have not been appreciable in view of the dynamic conditions of tire operation. In order to improve the riding quality of a tire and give softer riding, it has always been considered necessary to reduce the extent of inflation. Such action, however, always results in greatly increased tread wear. Consequently, there exists a technological conclusion that the improvement of either tread wear or soft riding properties is necessarily accomplished by a lessening of the other. The same type of conclusion is believed with respect to power consumption and tire softness.

Another problem of building a pneumatic tire concerns the resulting slip angle of the tire. Slip angle is generally defined as the angle which the equator of the integer of the tire tread in contact with the ground will assume with respect to the mid-circumferential plane of the rim when a giving-turning force is applied to the wheel. Since tires characterized by a high slip angle are difficult to steer, are objectionably noisy, due to squealing, and are characterized by increased tread wear, due to transverse abrasion, a reduction in the slip angle is always sought. Prior technology has dictated that a high slip angle can be reduced by stiffening the carcass or by over-inflating. Both modes for counteracting or reducing the high slip angle cause an appreciable sacrifice in riding comfort.

The novel tire construction, referred to in the preceding paragraphs, which ignores the aforementioned technological conclusions includes a carcass of plural plies each composed of radial cords in cooperation with a substantially cylindrical cincture belt of special design which is placed under tension when the tire is inflated and which functions to maintain and support the tread in a substantially flat condition.

It is accordingly an object of the present invention to provide a particular disposition of the parts constituting a pneumatic tire following the teachings of the co-pending application but with improvements in order to obtain a further remarkable reduction in the wear of the tread, and therefore impart a substantially longer life to the tire.

The tires of the above type are characterized both by a special construction of the carcass and by the presence of a special structure for the cincture belt, which is capable of carrying out a resistance action to be particularly designated. The coexistence of both the above features, as their functions are reciprocally integrating, is indispensable to the success of this invention.

It is a further object of the present invention to provide a unique structure for a pneumatic tire, ingeniously conceived, which substantially increases the tread life of the tire over that obtainable from a tire of standard construction, while at the same time reducing power consumption, decreasing slip angle and greatly enhancing riding comfort. This latter achievement is derived primarily from the use of thin, flexible sidewalls. In view of the unusual structure offered by the present invention, it is not only practical to utilize radial cords in the sidewalls, but it is preferred.

It is a still further object of the present invention to provide a pneumatic tire characterized by a carcass composed of plural plies, each made of radial cords, and relatively thin, flexible sidewalls and a substantially cylindrical cincture belt, which under inflation is placed in a tensioned condition and maintains and supports the tread in a substantially flat condition and which is characterized by a limited measure of articulation or pivotal action.

Other and further objects and advantages of this invention will become fully apparent from the following detailed description of preferred embodiments of the invention taken together with the appended drawings, in which:

Figure 1 is a view in cross section through a pneumatic tire made according to teachings of the above referred to application;

Figure 2 is a diagrammatic view of the cross section of a pneumatic tire made according to the teachings of the present invention;

Figure 3 is a view in elevation of the tire carcass;

Figure 4 is a view in section showing a preferred form of the present invention;

Figure 5 is a plan development of the cincture belt shown in Figure 4;

Figures 8 and 9 illustrate graphically a technique for making part of the cincture belt;

Figure 10 illustrates a further modification using the arrangement shown in Figure 9;

Figure 11 illustrates a technique for making the outer parts or packages of the cincture belt;

Figure 12 illustrates another method of making the outer parts or packages of the cincture belt;

Figure 13 illustrates a still further arrangement for the outer parts or packages of the cincture belt;

Figure 14 shows a tire provided with an interchangeable tread portion which includes the novel cincture belt; and Figure 15 shows an alternative version of the arrangement illustrated in Figure 14.

Figure 6:
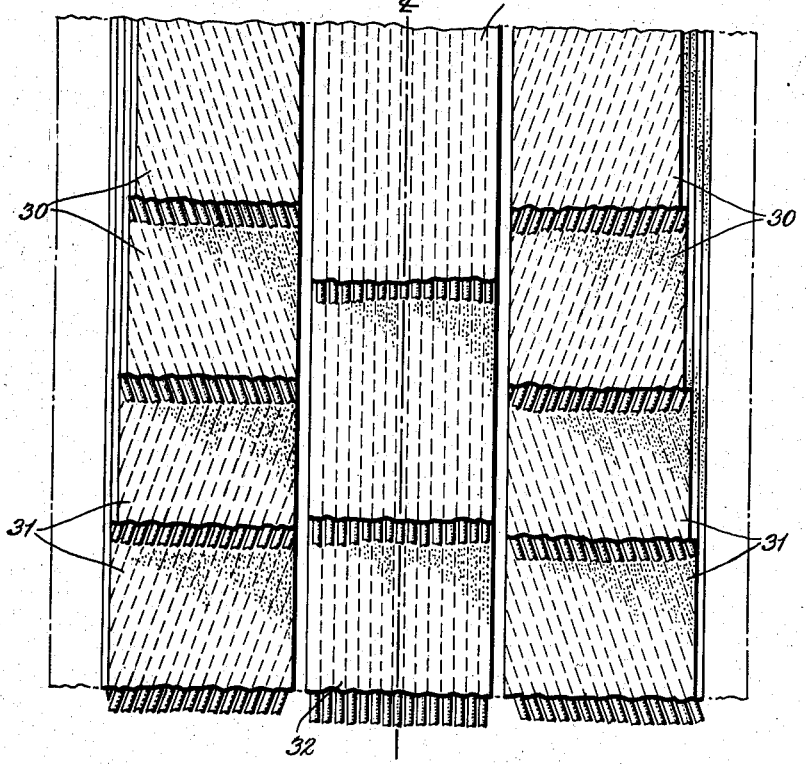
Figure 6 is a plan development of a modified version of the cincture belt shown in Figure 4.

In order to fully understand and appreciate the present invention in all of its ramifications, the following statements will be helpful.

The novel structure for a pneumatic tire according to the present invention contemplates a carcass composed essentially of radial cords, i.e., cords extending in radial planes with respect to the center of curvature or the axis of the pneumatic tire, a specially designed cincture belt and a tread portion.

The carcass, in order to cooperate from a functional standpoint with the specially designed cincture belt structure, must itself be constructed in such a way as not to hinder the movement of the cincture belt when the tire is squeezed against the ground due to or in response to loading of the tire. The considerations to be taken into account involve the particular disposition of the cords of the carcass plies and/or the nature of the material or materials of which they are composed.

The cincture belt structure is made of a series of three straps disposed in the zone below the tread and usually between the tread and the carcass but not necessarily so as it may form part of an interchangeable tread. The straps have a limited width, generally corresponding to the width of the tread itself. The preparation of the cincture belt may be carried out in many different ways with respect to the materials constituting the cords of the straps, the disposition and consequent working of the cords, and the particular manipulative steps employed. In any event, the culmination of efforts in this direction result in a cincture belt structure that prevents the tread, located immediately adjacent to it, from experiencing creeping in the so called "area of contact," namely, in the zone of the tire which is in contact with the ground during the running of the vehicle and while the tire is in squeezed condition due to loading action. The reduction in the creeping naturally results in a reduction of tread wear.

In the aforementioned application of which this invention constitutes a continuation-in-part, there is described a special type of pneumatic tire which is especially compatible with the invention described herein. In that application, a cincture belt is provided which functions to avoid the creeping of the tread. This result is achieved by means of a specially designed cincture belt arrangement that is capable of withstanding the normally encountered tension stresses and is placed under tension to the necessary degree by the inner inflation pressure of the tire. Reference is made to Figure 1 which shows in section a tire construction embodying the principles of the aforesaid application. There is shown a tire carcass 1 composed of several layers of parallel cords, and bead rings 2, a tread 4 and a cincture belt structure 3. To be fit for this aim, the cincture belt 3 is made of a series of two or more overlying plies of reduced width. The cords of each ply have a substantially longitudinal direction (that is, each of them is substantially contained into a plane perpendicular to the rotational axis of the tire), or have such a direction as to form a small angle (not greater than 20°) with said longitudinal direction (the angles of the cords of two adjacent plies being in this case symmetrical in respect to the mid-circumferential plane). The cords can be made of any substantially inextensible textile material including natural and synthetic organic fibers and threads, metallic thread, and other inorganic threads, and are disposed parallel to one another in each ply. The cords are rubberized with compounds of natural and/or synthetic rubber. The cincture belt structure 3, obtained as above described, exhibits remarkably improved performance under tension, as the capacity of the cords, and consequently of the straps, to withstand the tension stresses, is exploited to the fullest extent. In order to obtain this condition upon tension, a particular and special arrangement for the tire cross section is provided. By virtue of this innovation, the cincture belt structure 3 actually actively prevents and inhibits the carcass 1 from assuming its normal equilibrium or in repose condition when subject to the inflation pressure. This highly desirable result is achieved by adopting a design for a tire which is characterized by a maximum width not smaller than the height or to say this another way, the maximum transverse (axial) dimension of the tire is greater than its radial dimension.

The disposition of the carcass plies 1 which has proved to be the most efficient for use in cooperation with the above cincture belt structure 3 is that in which the cords of the several plies have such a direction that each of them lays entirely in a radial plane, that is, in a plane containing the rotational axis of the tire, or in a plane forming a small angle (not greater than 10°) with said radial plane. The cords can be made of any material and are disposed parallel to one another in each ply. They are rubberized, as is usual, with compounds of natural and/or synthetic rubber to assist in binding them together and in imparting resiliency to the carcass.

In order to obtain a reduction in the wear of the tread even beyond what is claimed for the novel tire structure disclosed in the aforesaid application and briefly described above, it is necessary to adopt a cincture belt structure which cooperates with the remaining structure to provide the area of the tread edges with an increased adaptability to the ground upon which the tire is running. These edge areas of the tread are, in fact, especially subjected to severe stresses and high load concentrations when the vehicle is running in curve (not in a straight line), or on roads having a remarkable cross curvature (high crown), or on irregular ground. If the edge areas of the tread cannot adapt to the ground (running surface), unequal loading of the tire results and the wear of the tread becomes distributed in an non-uniform way.

It is, of course, desirable to derive the requisite adaptability to the ground without sacrifice or otherwise affecting the tensile or stress capacity of the cincture belt structure to withstand the stresses to which it is subjected during the tire service.

The present invention provides such a new construction for the cincture belt structure, which preserves all of the desirable characteristics of the structure disclosed in the aforesaid application, to wit, avoiding the creeping of the tread by means of an assembly which, is subjected to tension upon inner inflation and is constructed to withstand the high tension stresses encountered during service, and further imparts greater utility by allowing the tread limited deformation freedom to adapt itself to the ground or running surface regardless of its topographical nature. The new construction for the cincture belt structure also gives the tires a better behavior, in respect of the comfort to passengers in the vehicle carried by the tires.

The unique cincture belt structure described and claimed in the present invention is composed essentially of two parts:

(a) A central portion or package is provided made of one or more superposed layers. The package has a reducted width in comparison with the width of the tread. In all cases, the package width does not exceed one-half of the tread width. The cords making up each layer or ply of the package are arranged parallel to one another and are disposed in a substantially longitudinal direction. Whereas, the width of the package is less than one-half the tread width, it can vary between values preferably ranging from one-half to one-fifth of the width of the tread.

(b) Two lateral portions or packages are further provided, arranged adjacent to said central package on either side thereof. Each package is made of several layers and each layer consists of a plurality of cords disposed in a parallel relationship. The cords in successive layers are disposed along directions forming angles, symmetrical to one another, with respect to the mid-circumferential plane of the tire. The angles have values preferably ranging from 5° to 45°. In each package the width of some layers, or of all the layers, may vary from one layer to the next. The preferred arrangement for the packages is to have the layers in each gradually decrease in width from one layer to the layer lying over it with the top layer being narrowest and the bottom layer being the widest.

The cords forming the layers of all packages of the cincture belt structure are made of substantially inextensible, low elongation natural, artificial, or synthetic textile materials, including metallic materials. The central portion or package may be comprised of cords made of the same material or a material different from the one constituting the cords of the lateral portions or packages, both said materials being chosen among those above indicated. Also the lateral packages may be made of different materials. The number of layers forming the central package may be equal to or different from, the number of layers constituting the lateral packages.

The assemblage of the cincture belt structure, composed of the central package described in paragraph (a) and of the two lateral packages described in paragraph (b) behaves as if the overall belt structure itself were provided with two intermediate hinges or regions of articulation or pivotal action, each located between a lateral package and the central package. This construction enables the three packages of the belt structure to function to a limited extent independently. Also the two lateral packages have a much greater extensibility as compared with the substantial inextensibility of the central package, due principally to the fact that the cords of the lateral packages form an appreciable angle with respect to the mid-circumferential plane. This greater extensibility contributes heavily to the adapatability of the tire to the ground in the areas corresponding to the tread edges.

Referring now to Figures 2 and 3 there is shown in cross section a pneumatic tire having a structure in accordance with the teachings of the present invention. The arrangement consists of a carcass 10 including bead rings 11, a tread 12, and a cincture belt structure composed of a central package 13 and lateral packages 14 and 15. The carcass 10 is shown in elevation in Figure 3 and consists of a plurality of layers of parallel cords with the cords disposed normal to the mid-circumferential plane of the tire, which in the drawing is a plane parallel to the plane of the drawing. The central portion or package 13 of the cincture belt structure is characterized by a width C ranging from one-half to one-fifth of the width L of the tire tread 12. The tire shown is further characterized by a maximum width or axial dimension greater than its maximum height or radial dimension.

The cincture belt structure 13, 14, and 15 is placed between the tread 12 and the carcass 10, as shown in Figure 2, in its usual position. In this respect, the carcass 10 is specially constructed as described in order not to hinder the movements of the structure itself. Carcasses of this kind are, for instance, those previously illustrated, that is, both the ones where the textile cords, including metallic type textiles, of each ply, parallel to one another, lie in radial planes as shown in Figure 3, and the ones described and claimed in co-pending application Serial No. 554,024, filed December 19, 1955 for "Novel Construction for a Pneumatic Tire." In the aforesaid application there is described a carcass construction composed of an even number of plies crossed along two directions, with the cords of each ply parallel to one another and so disposed that the cords of the plies lying along the other direction cross the plane of longitudinal symmetry of the tire (mid-circumferential or equatorial plane) at angles equal and symmetrical. The angles in any case are not greater than 70°. The cords are made of natural, artificial or synthetic textile material including metallic thread and possess an elastic elongation greater than that of the cords constituting the cincture belt structure by virtue of the material constituting them and/or their conformation and/or their disposition.

In a preferred form of realization of the invention as shown in Figures 4 and 5, the two lateral packages of the cincture belt structure are obtained by superposing an even number of layers 20 in each of which the cords are parallel to one another, and the direction of the cords of two adjacent layers form mutually symmetrical angles of from 5° to 45° with respect to the mid-circumferential plane of the tire. As shown, each lateral package is composed of four superposed plies or layers 20 of decreasing width from bottom to top.

The central package is composed of three superposed plies or layers 21, each composed of a plurality of parallel cords disposed in a substantially longitudinal direction. As shown by the plan development of Figure 5, the cords in the layers 20 forming the lateral packages extend at approximately a 20° angle with respect to the mid-circumferential plane of the tire identified in the drawing as the center line, whereas the cords forming layers 21 extend substantially parallel to the mid-circumferential plane.

In another form of realization of the invention the two lateral packages of the cincture belt structures are obtained by superposing a number of layers 30 all made of cords parallel to one direction and an equal number of layers 31 in which the cords are all parallel to a direction symmetrical to the preceding one with respect to the mid-circumferential plane. Such an arrangement is shown in the plan development of Figure 6. The lateral packages each consist of four plies or layers 30 and 31, as shown in Figures 4 and 5, with the layers 30 and 31 being of graduated width (maximum at the bottom and minimum at the top). The upper two layers 30 are composed of cords disposed in parallel relation and extending at an angle to the mid-circumferential plane of the tire of from 5° to 45°. An angle of about 20° is shown. The lower two layers 31 are composed of cords like the upper two, but they extend oppositely at a symmetrical angle with respect to the mid-circumferential plane. The central package, as before, is composed of three plies or layers 32 each having its cords disposed substantially parallel to the mid-circumferential plane of the tire.

A simple realization of the invention involves making each package of layers as a strap of suitable width, composed of cords parallel to one another and rubberized according to known methods.

Summarizing the above aims, a tire is provided by the present invention including a cincture belt structure which in its whole extends immediately below the tread with a total width nearly equal to width L of the tread itself. In the case illustrated in Figure 2, the cincture belt structure is formed from the combination of:

(a) A central package composed of three superposed layers 21 in which the cords are disposed in a longitudinal direction, said layers having a width C equal to about one-third of width L; and (b) Two lateral packages adjacent to the central package, each of which is constituted of four superposed layers 20 where the cords, parallel to one another in each layer, have symmetrical directions in two adjacent layers with respect to the mid-circumferential plane of the tire, the width of each layer being smaller than that of the layer lying immediately below it.

It is to be remarked that for the purposes of the present invention compounds of natural and/or synthetic rubber or plastic materials may be employed for rubberizing the plies, the straps and the cords. It is also to be understood that the expression "cords" is designed to indicate filiform elements constituted of single threads or a plurality of threads in braided relationship as known in the tire industry, which are made of natural, artificial, or synthetic textile material, a term intended to include metallic material.

As mentioned, the cords of the central package and those of the lateral packages are made of almost inextensible natural, artificial, or synthetic textile material including metallic material. It should be noted, however, that the present invention in its broadest aspect includes the packages being made of materials different from one another.

There is illustrated in Figures 7 to 10, an improvement in the construction of the cincture belt structure, as described above, which enables the various portions of the structure to carry out their own functions in a more efficient way.

More particularly this improvement relates to a special method for making the two lateral packages of the cincture belt structure, and precisely it provides that each of them be formed of at least one strap or layer folded in such a way that it is completely or partially doubled, and positioned in the tire with the folding line disposed near the central package of the cincture belt structure. The cords of the strap or layer are parallel to one another and have an inclined direction with respect to the mid-circumferential plane of the tire, so that after the folding operation the strap or layer will be composed of two superposed laps. The cords of one lap will form an angle symmetrical to that of the cords of the other lay with respect to the mid-circumferential of the tire.

The improvement described above for the cincture belt structure has proved advantageous in that the folds of the straps or layers constituting the two lateral packages, when positioned closely adjacent to the sides of the central package, cooperate to maintain the latter in a longitudinal position. Moreover, the portions where the straps or layers are folded are given a greater stiffness. This makes the stiffness variation occurring in the transition from the central package to the lateral ones more gradual and a stiffness gradient results. Another advantage results from the simplified construction of the lateral packages.

When each of the lateral packages of the cincture belt structure is made of more than one folded strap or layer, they are superposed to one another, and may have a different width. If so, it is preferred that the width gradually decrease from one strap to the adjacent superposed one.

In a constructive variation of the improvement, the folding operation can be carried out by using two or more straps or layers which are superposed before folding.

Figure 7:
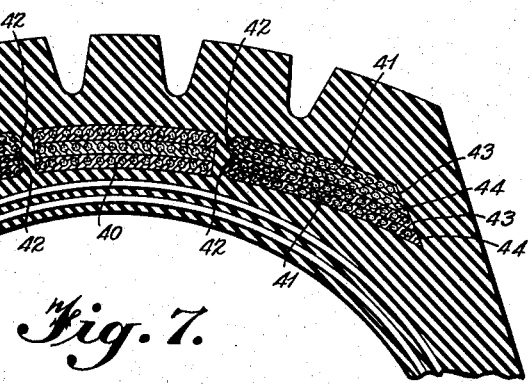
Figure 7 is a view in section similar to Figure 4 showing an alternative arrangement for the cincture belt.

Figure 7 portrays in section, interrupted before the sidewall zone of the tire, the improved cincture belt structure comprised of a central package composed of three layers 40 wherein the rubberized cords constituting each layer 40 have a longitudinal direction, and each of two lateral packages made by superposing two folded straps or layers 41. Each strap 41 has been previously partially doubled prior to incorporation into the tire, so that the lower lap is wider than the upper lap; moreover the folding lines 42 are disposed near the central package.

Figures 8 and 9 illustrate the method of folding one strap 41 of a lateral package. Figure 8 shows a piece of strap 41 before being doubled. It is composed of rubberized cords, all parallel to one another, and having a direction that forms an angle of from 5° to 45° with respect to the mid-circumferential plane of the tire. An angle of 30° is shown. N—M represents a fold line. Figure 9 shows the same piece of strap 41, after it has been folded along line N—M in such a way that the superposed lap 43 is narrower than the lap 44 lying below it.

Figure 10 represents a pneumatic tire in which the cincture belt structure is constructed according to the realization of the invention, in which each of the two lateral packages is obtained by folding two straps 50, previously superposed. The folding lines 51 again are disposed near the central package composed of three layers 40 as described with reference to Figure 7.

Referring now to Figure 11, there is shown schemmatically a method for fabricating an improved lateral package or lateral part for incorporation into the cincture belt structure heretofore disclosed. The fabrication includes the steps of wrapping a strip of fabric 60 consisting of an assembly of threads or cords disposed parallel to the axis A—A of the fabric, or in other words, the longitudinal axis of the fabric strip 60, in helical fashion at proper pitch to form a tube. Although the form or apparatus about which the fabric is wound in the formation of the tube is not shown in Figure 11, it will be appreciated that any suitable form or apparatus can be used in this manipulative operation. It will also be appreciated that the width of the fabric strip 60 will have to be selected in accordance with the desired width of the finished product. The selection of fabric width can easily and readily be made based upon the pitch of the helical wrapping. Subsequent to the formation of the tube, by helically wrapping of the fabric strip 60, the tube is flattened or squeezed, as for example, by a pair of rollers 61 in order to produce a finished product. As will be evident, the finished product is characterized by two superimposed layers or plies with the ends of the threads or cords in each of the layers or plies joined with, integral with or a continuation of the threads or cords disposed in the other of the layers or plies. Further, the angular disposition of the threads or cords in one of the plies upon flattening of the tube becomes symmetrical with respect to the angular disposition of the threads or cords in the other of the plies with respect to the mid-circumferential plane. The angle ranges from 5° to 45°. The final product can be used as is for the lateral portions or packages or can be superposed with ordinary layers or two such products can be superposed to make up each lateral package.

Another way for producing an improved product for use in making the lateral packages is illustrated in Figure 12. As clearly shown by the illustration, a strip of fabric 70, having a width W and composed of threads or cords parallel to its long axis B—B is folded alternatively in both senses, as illustrated. Stated in other words, the strip 70 is folded in a zig-zag overlapping or superimposed pattern. By this means, a structure is obtained which can be considered as consisting of a series of parallelograms superimposed upon one another for one-half of their whole surface, namely, for a zone corresponding to a triangle. In each of the parallelograms, the threads or cords lying within the perimeter, have their ends joined with, integral with, or a continuation of the threads or cords of the parallelogram upon which it is superimposed. Further, the disposition of the parallelogram is such that the threads or cords lying in each triangular section have a direction symmetrically crossed with the direction of the threads or cords lying in the triangular section disposed below or above them. All cords form an angle with the mid-circumferential plane of the tire of from 5° to 45°. An advantage achieved by producing the product in this way arises from the possibility that the structure may be obtained from a very thin fabric strip or it can even be produced by using a single thread covered with a compound based on an uncured natural or synthetic rubber or any suitable plastic material and winding the coated single thread on a form such as a drum at a suitable pitch.

The product produced by such a mode as that last-mentioned is illustrated in Figure 13. To produce this product, a drum is employed having a width L, an axis O—O', and a radius R. Starting from any point A on one marginal peripheral edge of the drum, a thread previously covered with a compound of rubber or plastic material is disposed in such a way that it reaches a point B on the opposite marginal peripheral edge of the drum. The thread is disposed at a pitch P and extends for a distance equal to the arc of circumference existing between the generating lines of the cylindrical drum which pass through points A and B. From point B, at equal pitch, the thread is drawn to point A' located peripherally spaced from A a value equal to 2P. Continuing the procedure in this alternative fashion, if the number of pitches P is even, namely if $$P = \frac{2R+S}{2N}$$

where N equals any whole number, and S equals the thickness of the rubberized thread, after a complete turn, the thread will reach a point $A_1$ immediately adjacent to point A. Continuing the procedure further, the whole surface of the cylinder will ultimately be covered with threads disposed in side-by-side relation so as to obtain practically a continuous surface by virtue of the adhesive property of the coating of rubber or plastic material which covers the threads. It will undoubtedly be appreciated that the above operations could also be carried out in an identical fashion using a narrow strip composed of a plurality of threads or cords instead of merely using a single thread.

It will be evident that the above described procedure may be carried out upon a suitable shrinkable, compressible, or collapsible drum to facilitate removal. It is likewise evident that the above procedure may be continued after the formation of a structure of two plies or layers by continuing to build up over the first laid down thread, an additional layer of thread and in this way obtain a complete lateral package made up of the necessary number of layers or plies. There is, as will be recognized, only a practical limit to the number of layers of thread which can be formed by this procedure.

The products or structures obtained by the procedures discussed with reference to Figures 11 to 13 will not show along their marginal edges any free ends of thread nor will any joints appear between the threads lying in different layers or planes. Moreover, the structures of Figures 12 and 13 will give the appearance on both sides of being constituted of a succession of isosceles triangles in which the direction of the thread of two adjacent triangles is different with the direction of the threads being the same in successive alternate triangles throughout the length of the structure. The products or structures mentioned above and illustrated in Figures 11–13 are disclosed in greater detail in co-pending application Serial No. 488,286, filed February 15, 1955 for Flexible Ring-Shaped Structure and Improved Pneumatic Tire and Method For Making Same.

Referring now to Figures 14 and 15, there is shown a construction for a pneumatic tire wherein tread 80 is made separate from carcass 81 including radial cords 82 and therefore the tread is interchangeable. The cincture belt construction, composed of central package 83 and lateral packages 84, is embedded in the tread portion of the construction and hence is removed with it. In Figure 14, the carcass is undercut where it receives the tread and accordingly a dovetail joint is created. In Figure 15, the carcass is beveled oppositely to that shown in Figure 14. In place of arranging the cincture belt structure as part of the tread, it will be understood that arranging the cincture belt structure as part of the carcass in combination with an interchangeable tread is not to be precluded from the scope of the present invention. The construction illustrated in Figures 14 and 15 are described and claimed in greater detail in co-pending application Serial No. 431,550, filed May 21, 1954.

Although the subject matter described herein has been with reference to specific preferred embodiments, nevertheless, it is to be understood that same should not be construed as placing any undue limitation or restriction upon the extent of the inventive contribution disclosed herein. It will also be appreciated that many changes and modifications of this invention will suggest themselves and appear obvious to persons skilled in this art. Such changes and modifications which do not depart in any way from the spirit, scope and contemplation of the inventive concepts herein advanced are deemed to fall within the purview of the invention.

What is claimed is:

1. In a pneumatic tire construction including an interior carcass portion, an external tread portion and a cincture belt structure contained therebetween, the improvement comprising the cincture belt being formed of a group of three separate packages axially arranged in juxtaposition, the central package of said group being constituted of at least one layer composed of a plurality of cords extending in a direction substantially parallel with the mid-circumferential plane of the tire and each lateral package of said group being constituted of superposed layers each composed of a plurality of cords extending in a direction to form an acute angle of 5 to 45° with the mid-circumferential plane of the tire.

2. In a pneumatic tire construction including an interior carcass portion, an external tread portion and a cincture belt structure contained therebetween, the improvement comprising the cincture belt being formed of a group of three separate packages axially arranged in juxtaposition, the central package of said group being constituted of at least one layer composed of a plurality of cords extending in a direction substantially parallel with the mid-circumferential plane of the tire, said central package having a width of from ½ to ⅕ the width of the tread portion, and each lateral package of said group being constituted of superposed layers each composed of a plurality of cords extending in a direction to form an acute angle of 5 to 45° with the mid-circumferential plane of the tire.

3. In a pneumatic tire construction including an interior carcass portion, an external tread portion and a cincture belt structure contained therebetween, the improvement comprising the cincture belt being formed of a group of three separate packages axially arranged in juxtaposition, the central package of said group being constituted of at least one layer composed of a plurality of substantially inextensible cords extending in a direction substantially parallel with the mid-circumferential plane of the tire and each lateral package of said group being constituted of superposed layers each composed of a plurality of substantially inextensible cords extending in a direction to form an acute angle of 5 to 45° with the mid-circumferential plane of the tire.

4. In a pneumatic tire construction including an interior carcass portion, an external tread portion and a cincture belt structure contained therebetween, the improvement comprising the cincture belt being formed of a group of three separate packages axially arranged in juxtaposition, the central package of said group being constituted of plural layers each composed of a plurality of cords extending in a direction substantially parallel with the mid-circumferential plane of the tire and each lateral package of said group being constituted of superposed layers each composed of a plurality of cords extending in a direction to form an acute angle of 5 to 45° with the mid-circumferential plane of the tire.

5. In a pneumatic tire construction including an interior carcass portion, an external tread portion and a cincture belt structure contained therebetween, the improvement comprising the cinture belt being formed of a group of three separate packages axially arranged in juxtaposition, the central package of said group being constitutted of at least one layer composed of a plurality of cords extending in a direction substantially parallel with the mid-circumferential plane of the tire and each lateral package of said group being constituted of superposed layers each composed of a plurality of cords, said cords in different layers extending in directions to form mutually symmetrical angles of 5 to 45° with the mid-circumferential plane of the tire.

6. In a pneumatic tire construction including an interior carcass portion, an external tread portion and a cincture belt structure contained therebetween, the improvement comprising the cincture belt being formed of a group of three separate packages axially arranged in juxtaposition, the central package of said group being constituted of at least one layer composed of a plurality of cords extending in a direction substantially parallel with the mid-circumferential plane of the tire and each lateral package of said group being constituted of an even number of superposed layers each composed of a plurality of cords extending in a direction to form an acute angle of 5 to 45° with the mid-circumferential plane of the tire.

7. In a pneumatic tire construction including an interior carcass portion, an external tread portion and a cincture belt structure contained therebetween, the improvement comprising a cincture belt being formed of a group of three separate packages axially arranged in juxtaposition, the central package of said group being constitutted of at least one layer composed of a plurality of cords extending in a direction substantially parallel with the mid-circumferential plane of the tire and each lateral package of said group being constituted of superposed layers each composed of a plurality of cords, said cords in adjacent layers extending in directions to form mutually symmetrical angles of 5 to 45° with the mid-circumferential plane of the tire.

8. In a pneumatic tire construction including an interior carcass portion, an external tread portion and a cincture belt structure contained therebetween, the improvement comprising the cincture belt being formed of a group of three separate packages axially arranged in juxtaposition, the central package of said group being constituted of at least one layer composed of a plurality of cords extending in a direction substantially parallel with the mid-circumferential plane of the tire and each lateral package of said group being constituted of at least four superposed layers each composed of a plurality of cords, said cords in the upper half of said layers and those in the lower half of said layers extending in directions to form mutually symmetrical angles of 5 to 45° with the mid-circumferential plane of the tire.

9. In a pneumatic tire construction including an interior carcass portion, an external tread portion and a cincture belt structure contained therebetween, the improvement comprising the cincture belt being formed of a group of three separate packages axially arranged in juxtaposition, the central package of said group being constituted of at least one layer composed of a plurality of cords extending in a direction substantially parallel with the mid-circumferential plane of the tire and each lateral package of said group being constituted of a plurality of superposed layers graduated in width with the widest on the bottom, each layer composed of a plurality of cords extending in a direction to form an acute angle of 5 to 45° with the mid-circumferential plane of the tire.

10. In a pneumatic tire construction including an interior carcass portion, an external tread portion and a cincture belt structure contained therebetween, the improvement comprising the cincture belt being formed of a group of three separate packages axially arranged in juxtaposition, the central package of said group being constituted of at least one layer composed of a plurality of cords extending in a direction substantially parallel with the mid-circumferential plane of the tire and each lateral package of said group being constituted of superposed folded layers with the fold lines adjacent the central package, each layer composed of a plurality of cords extending in a direction to form an acute angle of 5 to 45° with the mid-circumferential plane of the tire.

11. In a pneumatic tire construction including an interior carcass portion, an external tread portion and a cincture belt structure contained therebetween, the improvement comprising the cincture belt being formed of a group of three separate packages axially arranged in juxtaposition, the central package of said group being constituted of at least one layer composed of a plurality of cords extending in a direction substantially parallel with the mid-circumferential plane of the tire and each lateral package of said group being constituted of folded superposed layers with the fold line adjacent the central package, each layer composed of a plurality of cords extending in a direction to form an acute angle of 5 to 45° with the mid-circumferential plane of the tire.

12. In a pneumatic tire construction including an interior carcass portion, an external tread portion and a cincture belt structure contained therebetween, the improvement comprising the cincture belt being formed of a group of three separate packages axially arranged in juxtaposition, the central package of said group being constituted of at least one layer composed of a plurality of cords extending in a direction substantially parallel with the mid-circumferential plane of the tire and each lateral package of said group being constituted of superposed layers each composed of a plurality of cords extending in a direction to form an acute angle of 5 to 45° with the mid-circumferential plane of the tire, the cords forming the central package and those forming the lateral packages being of different materials.

13. In a pneumatic tire construction including an interior carcass portion, an external tread portion and a cincture belt structure contained therebetween, the improvement comprising the cincture belt being formed of a group of three separate packages axially arranged in juxtaposition, the central package of said group being constituted of at least one layer composed of a plurality of cords extending in a direction substantially parallel with the mid-circumferential plane of the tire and each lateral package of said group being constituted of superposed layers each composed of a plurality of cords extending in a direction to form an acute angle of 5 to 45° with the mid-circumferential plane of the tire, the cords forming the lateral packages being of different materials.

14. In a pneumatic tire construction including a carcass, an interchangeable tread and a cincture belt structure contained therein, the improvement comprising the cincture belt being formed of a group of three separate packages axially arranged in juxtaposition, the central package of said group being constituted of at least one layer composed of a plurality of cords extending in a direction substantially parallel with the mid-circumferential plane of the tire and each lateral package of said group being constituted of superposed layers each composed of a plurality of cords extending in a direction to form an acute angle of 5 to 45° with the mid-circumferential plane of the tire.

15. In a pneumatic tire construction including an interior carcass portion, an external tread portion and a cincture belt structure contained therebetween, the improvement comprising the cincture belt being formed of a group of three separate packages axially arranged in juxtaposition, the central package of said group being constituted of at least one layer composed of a plurality of cords extending in a direction substantially parallel with the mid-circumferential plane of the tire and each lateral package of said group being constituted of superposed layers composed of a plurality of cords extending in a direction to form an acute angle of 5 to 45° with the mid-circumferential plane of the tire, each said lateral package being formed from a helically wrapped and flattened strip of parallel cords.

16. In a pneumatic tire construction including an interior carcass portion, an external tread portion and a cincture belt structure contained therebetween, the improvement comprising the cincture belt being formed of a group of three separate packages axially arranged in juxtaposition, the central package of said group being constituted of at least one layer composed of a plurality of cords extending in a direction substantially parallel with the mid-circumferential plane of the tire and each lateral package of said group being constituted of superposed layers each composed of a plurality of cords extending in a direction to form an acute angle of 5 to 45° with the mid-circumferential plane of the tire, each said lateral package being formed from a single unbroken cord.

17. In a pneumatic tire construction including an interior carcass portion, an external tread portion and a cincture belt structure contained therebetween, the improvement comprising the cincture belt being formed of a group of three separate packages axially arranged in juxtaposition, the central package of said group being constituted of at least one layer composed of a plurality of cords extending in a direction substantially parallel with the mid-circumferential plane of the tire and each lateral package of said group being constituted of superposed layers each composed of a plurality of cords extending in a direction to form an acute angle of 5 to 45° with the mid-circumferential plane of the tire, each said lateral package being formed by zig-zag folding, at a bias, of a strip of parallel cords.

18. A pneumatic tire casing comprising a carcass composed of beads and layers formed of parallel rubberized cords joining said beads, said cords extending in a direction to form an angle of from about 80° to about 90° with the mid-circumferential plane of the tire, a tread portion the lateral edges of which terminate between the points defining the maximum axial dimension of the tire carcass, said tread portion having a substantially flat ground-contacting surface about its circumference, and a substantially cylindrical cincture belt structure disposed wholly between the carcass and the tread portion and having a width less than that of the tread portion, said cincture belt structure consisting of a group of three packages arranged in juxtaposition, the central package of said group being constituted of at least one layer composed of a plurality of cords extending in a direction substantially parallel with the mid-circumferential plane of the tire, and each lateral package of said group being constituted of superposed layers, each composed of cords extending in a direction to form an acute angle of 5 to 45° with the mid-circumferential plane of the tire, and the maximum radial dimension of the casing from bead to tread being less than the maximum axial dimension defined by said casing whereby in the inflated condition of the tire the cincture belt structure is placed under tension and maintains said tread portion in said substantially flat condition and minimizes expansion and contraction of the tread in its area of contact with the ground during rolling.

19. A pneumatic tire casing comprising a carcass composed of beads and layers formed of parallel rubberized cords joining said beads, said cords extending in a direction to form an angle of from about 80° to about 90° with the mid-circumferential plane of the tire, a tread portion the lateral edges of which terminate between the points defining the maximum axial dimension of the tire carcass, said tread portion having a substantially flat ground-contacting surface about its circumference, and a substantially cylindrical cincture belt structure disposed wholly between the carcass and the tread portion and having a width less than that of the tread portion, said cincture belt structure consisting of a group of three packages arranged in juxtaposition, the central package of said group being constituted of at least one layer composed of a plurality of cords extending in a direction substantially parallel with the mid-circumferential plane of the tire, said central package having a width of from ½ to ⅕ the width of said tread portion, and each lateral package of said group being constituted of superposed layers, each composed of cords extending in a direction to form an acute angle of 5 to 45° with the mid-circumferential plane of the tire, and the maximum radial dimension of the casing from bead to tread being less than the maximum axial dimension defined by said casing whereby in the inflated condition of the tire the cincture belt structure is placed under tension and maintains said tread portion in said substantially flat condition and minimizes expansion and contraction of the tread in its area of contact with the ground during rolling.

20. A pneumatic tire casing comprising a carcass composed of beads and layers formed of parallel rubberized cords joining said beads, said cords extending in a direction to form an angle of from about 80° to about 90° with the mid-circumferential plane of the tire, a tread portion the lateral edges of which terminate between the points defining the maximum axial dimension of the tire carcass, said tread portion having a substantially flat ground-contacting surface about its circumference, and a substantially cylindrical cincture belt structure disposed wholly between the carcass and the tread portion and having a width less than that of the tread portion, said cincture belt structure consisting of a group of three packages arranged in juxtaposition, the central package of said group being constituted of plural layers each composed of a plurality of cords extending in a direction substantially parallel with the mid-circumferential plane of the tire, and each lateral package of said group being constituted of superposed layers, each composed of cords extending in a direction to form an acute angle of 5 to 45° with the mid-circumferential plane of the tire, and the maximum radial dimension of the casing from bead to tread being less than the maximum axial dimension defined by said casing whereby in the inflated condition of the tire the cincture belt structure is placed under tension and maintains said tread portion in said substantially flat condition and minimizes expansion and contraction of the tread in its area of contact with the ground during rolling.

21. A pneumatic tire casing comprising a carcass composed of beads and layers formed of parallel rubberized cords joining said beads, said cords extending in a direction to form an angle of from about 80° to about 90° with the mid-circumferential plane of the tire, a tread portion the lateral edges of which terminate between the points defining the maximum axial dimension of the tire carcass, said tread portion having a substantially flat ground-contacting surface about its circumference, and a substantially cylindrical cincture belt structure disposed wholly between the carcass and the tread portion and having a width less than that of the tread portion, said cincture belt structure consisting of a group of three packages arranged in juxtaposition, the central package of said group being constituted of at least one layer composed of a plurality of substantially inextensible cords extending in a direction substantially parallel with the mid-circumferential plane of the tire, and each lateral package of said group being constituted of superposed layers, each composed of substantially inextensible cords extending in a direction to form an acute angle of 5 to 45° with the mid-circumferential plane of the tire, and the maximum radial dimension of the casing from bead to tread being less than the maximum axial dimension defined by said casing whereby in the inflated condition of the tire the cincture belt structure is placed under tension and maintains said tread portion in said substantially flat condition and minimizes expansion and contraction of the tread in its area of contact with the ground during rolling.

22. A pneumatic tire casing comprising a carcass composed of beads and layers formed of parallel rubberized cords joining said beads, said cords extending in a direction to form an angle of from about 80° to about 90° with the mid-circumferential plane of the tire, a tread portion the lateral edges of which terminate between the points defining the maximum axial dimension of the tire carcass, said tread portion having a substantially flat ground-contacting surface about its circumference, and a substantially cylindrical cincture belt structure disposed wholly between the carcass and the tread portion and having a width less than that of the tread portion, said cincture belt structure consisting of a group of three packages arranged in juxtaposition, the central package of said group being constituted of at least one layer composed of a plurality of cords extending in a direction substantially parallel with the mid-circumferential plane of the tire, and each lateral package of said group being constituted of superposed layers, each composed of a plurality of cords, said cords in different layers extending in directions to form mutually symmetrical angles of 5 to 45° with the mid-circumferential plane of the tire, andd the maximum radial dimension of the casing from bead to tread being less than the maximum axial dimension defined by said casing whereby in the inflated condition of the tire the cincture belt structure is placed under tension and maintains said tread portion in said substantially flat condition and minimizes expansion and contraction of the tread in its area of contact with the ground during rolling.

23. A pneumatic tire casing comprising a carcass composed of beads and layers formed of parallel rubberized cords joining said beads, said cords extending in a direction to form an angle of from about 80° to about 90° with the mid-circumferential plane of the tire, a tread portion the lateral edges of which terminate between the points defining the maximum axial dimension of the tire carcass, said tread portion having a substantially flat ground-contacting surface about its circumference, and a substantially cylindrical cincture belt structure disposed wholly between the carcass and the tread portion and having a width less than that of the tread portion, said cincture belt structure consisting of a group of three packages arranged in juxtaposition, the central package of said group being constituted of at least one layer composed of a plurality of cords extending in a direction substantially parallel with the mid-circumferential plane of the tire, and each lateral package of said group being constituted of an even number of superposed layers, each composed of cords extending in a direction to form an acute angle of 5 to 45° with the mid-circumferential plane of the tire, and the maximum radial dimension of the casing from bead to tread being less than the maximum axial dimension defined by said casing whereby in the inflated condition of the tire the cincture belt structure is placed under tension and maintains said tread portion in said substantially flat condition and minimizes expansion and contraction of the tread in its area of contact with the ground during rolling.

24. A pneumatic tire casing comprising a carcass composed of beads and layers formed of parallel rubberized cords joining said beads, said cords extending in a direction to form an angle of from about 80° to about 90° with the mid-circumferential plane of the tire, a tread portion the lateral edges of which terminate between the points defining the maximum axial dimension of the tire carcass, said tread portion having a substantially flat ground-contacting surface about its circumference, and a substantially cylindrical cincture belt structure disposed wholly between the carcass and the tread portion and having a width less than that of the tread portion, said cincture belt structure consisting of a group of three packages arranged in juxtaposition, the central package of said group being constituted of at least one layer composed of a plurality of cords extending in a direction substantially parallel with the mid-circumferential plane of the tire, and each lateral package of said group being constituted of superposed layers, each composed of cords which in adjacent layers extend in directions to form mutually symmetrical angles of 5 to 45° with the mid-circumferential plane of the tire, and the maximum radial dimension of the casing from bead to tread being less than the maximum axial dimension defined by said casing whereby in the inflated conditions of the tire the cincture belt structure is placed under tension and maintains said tread portion in said substantially flat condition and minimizes expansion and contraction of the tread in its area of contact with the ground during rolling.

25. A pneumatic tire casing comprising a carcass composed of beads and layers formed of parallel rubberized cords joining said beads, said cords extending in a direction to form an angle of from about 80° to about 90° with the mid-circumferential plane of the tire, a tread portion the lateral edges of which terminate between the points defining the maximum axial dimension of the tire carcass, said tread portion having a substantially flat ground-contacting surface about its circumference, and a substantially cylindrical cincture belt structure disposed wholly between the carcass and the tread portion and having a width less than that of the tread portion, said cincture belt structure consisting of a group of three packages arranged in juxtaposition, the central package of said group being constituted of at least one layer composed of a plurality of cords extending in a direction substantially parallel with the mid-circumferential plane of the tire, and each lateral package of said group being constituted of at least four superposed layers, each composed of cords which extend in the upper half of said layers and in the lower half of said layers in directions to form mutually symmetrical angles of 5 to 45° with the mid-circumferential plane of the tire, and the maximum radial dimension of the casing from bead to tread being less than the maximum axial dimension defined by said casing whereby in the inflated conditions of the tire the cincture belt structure is placed under tension and maintains said tread portion in said substantially flat condition and minimizes expansion and contraction of the tread in its area of contact with the ground during rolling.

26. A pneumatic tire casing comprising a carcass composed of beads and layers formed of parallel rubberized cords joining said beads, said cords extending in a direction to form an angle of from about 80° to about 90° with the mid-circumferential plane of the tire, a tread portion the lateral edges of which terminate between the points defining the maximum axial dimension of the tire carcass, said tread portion having a substantially flat ground-contacting surface about its circumference, and a substantially cylindrical cincture belt structure disposed wholly between the carcass and the tread portion and having a width less than that of the tread portion, said cincture belt structure consisting of a group of three packages arranged in juxtaposition, the central package of said group being constituted of at least one layer composed of a plurality of cords extending in a direction substantially parallel with the mid-circumferential plane of the tire, and each lateral package of said group being constituted of graduated in width superposed layers with the narrowest on top, each layer composed of cords extending in a direction to form an acute angle of 5 to 45° with the mid-circumferential plane of the tire, and the maximum radial dimension of the casing from bead to tread being less than the maximum axial dimension defined by said casing whereby in the inflated conditions of the tire the cincture belt structure is placed under tension and maintains said tread portion in said substantially flat condition and minimizes expansion and contraction of the tread in its area of contact with the ground during rolling.

27. A pneumatic tire casing comprising a carcass composed of beads and layers formed of parallel rubberized cords joining said beads, said cords extending in a direction to form an angle of from about 80° to about 90° with the mid-circumferential plane of the tire, a tread portion the lateral edges of which terminate between the points defining the maximum axial dimension of the tire carcass, said tread portion having a substantially flat ground-contacting surface about its circumference, and a substantially cylindrical cincture belt structure disposed wholly between the carcass and the tread portion and having a width less than that of the tread portion, said cincture belt structure consisting of a group of three packages arranged in juxtaposition, the central package of said group being constituted of at least one layer composed of a plurality of cords extending in a direction substantially parallel with the mid-circumferential plane of the tire, and each lateral package of said group being constituted of superposed folded layers with the fold lines adjacent the central package, each layer composed of cords extending in a direction to form an acute angle of 5 to 45° with the mid-circumferential plane of the tire, and the maximum radial dimension of the casing from bead to tread being less than the maximum axial dimension defined by said casing whereby in the inflated conditions of the tire the cincture belt structure is placed under tension and maintains said tread portion in said substantially flat condition and minimizes expansion and contraction of the tread in its area of contact with the ground during rolling.

28. A pneumatic tire casing comprising a carcass composed of beads and layers formed of parallel rubberized cords joining said beads, said cords extending in a direction to form an angle of from about 80° to about 90° with the mid-circumferential plane of the tire, a tread portion the lateral edges of which terminate between the points defining the maximum axial dimension of the tire carcass, said tread portion having a substantially flat ground-contacting surface about its circumference, and a substantially cylindrical cincture belt structure disposed wholly between the carcass and the tread portion and having a width less than that of the tread portion, said cincture belt structure consisting of a group of three packages arranged in juxtaposition, the central package of said group being constituted of at least one layer composed of a plurality of cords extending in a direction substantially parallel with the mid-circumferential plane of the tire, and each lateral package of said group being constituted of superposed layers, each composed of cords extending in a direction to form an angle of from 5° to 45° with the mid-circumferential plane of the tire, and the maximum radial dimension of the casing from bead to tread being less than the maximum axial dimension defined by said casing whereby in the inflated conditions of the tire the cincture belt structure is placed under tension and maintains said tread portion in said substantially flat condition and minimizes expansion and contraction of the tread in its area of contact with the ground during rolling.

29. A pneumatic tire casing comprising a carcass composed of beads and layers formed of parallel rubberized cords joining said beads, said cords extending in a direction to form an angle of from about 80° to about 90° with the mid-circumferential plane of the tire, an interchangeable tread received in said carcass and retained therein, the lateral edges of which terminate between the points defining the maximum axial dimension of the tire carcass, said tread having a substantially flat ground-contacting surface about its circumference, and a substantially cylindrical cincture belt structure disposed within the tread and having a width less than that of the tread, said cincture belt structure consisting of a group of three packages arranged in juxtaposition, the central package of said group being constituted of at least one layer composed of a plurality of cords extending in a direction substantially parallel with the mid-circumferential plane of the tire, and each lateral package of said group being constituted of superposed layers, each composed of cords extending in a direction to form an acute angle of 5 to 45° with the mid-circumferential plane of the tire, and the maximum radial dimension of the casing from bead to tread being less than the maximum axial dimension defined by said casing whereby in the inflated condition of the tire the cincture belt structure is placed under tension and maintains said tread portion in said substantially flat condition and minimizes expansion and contraction of the tread in its area of contact with the ground during rolling.

References Cited in the file of this patent

UNITED STATES PATENTS

| | | |
|---|---|---|
| 1,894,237 | Mallory | Jan. 10, 1933 |
| 2,477,754 | Kraft | Aug. 2, 1949 |
| 2,493,614 | Bourdon | Jan. 3, 1950 |

FOREIGN PATENTS

| | | |
|---|---|---|
| 508,165 | Belgium | Jan. 15, 1952 |
| | (Corresponding English language patent) | |
| 700,435 | Great Britain | Dec. 2, 1953 |

UNITED STATES PATENT OFFICE
Certificate of Correction

Patent No. 2,895,525

July 21, 1959

Giuseppe Lugli

It is hereby certified that error appears in the printed specification of the above numbered patent requiring correction and that the said Letters Patent should read as corrected below.

Column 1, line 29, for "October 22, 1952" read —October 23, 1952—; line 31, for "June 8, 1954" read —June 28, 1954—; line 32, for "December 22, 1955" read —December 27, 1955—; line 34, for "February 2, 1956" read —February 29, 1956—; column 5, lines 25 and 26, for "reducted" read —reduced—; column 6, line 1, for "adapatability" read —adaptability—; column 7, line 67, for "lay" read —lap—; same line 67, after "mid-circumferential" insert —plane—; column 9, lines 49 and 50, the formula should appear as shown below instead of as in the patent—

$$P = \frac{2\pi R + S}{2N}$$

column 11, lines 34 and 62, for "constitutted", each occurrence, read —constituted—.

Signed and sealed this 1st day of March 1960.

[SEAL]

Attest:
KARL H. AXLINE,
Attesting Officer.

ROBERT C. WATSON,
Commissioner of Patents.